(12) United States Patent
Lindt

(10) Patent No.: US 6,954,565 B2
(45) Date of Patent: Oct. 11, 2005

(54) COUPLING CONFIGURATION FOR OPTICALLY COUPLING AN OPTICAL CONDUCTOR TO AN OPTO-RECEIVER

(75) Inventor: Paul Lindt, Donauwörth (DE)

(73) Assignee: Infineon Technologies AG, Munich (DE)

( * ) Notice: Subject to any disclaimer, the term of this patent is extended or adjusted under 35 U.S.C. 154(b) by 32 days.

(21) Appl. No.: 10/159,154

(22) Filed: May 31, 2002

(65) Prior Publication Data

US 2002/0181862 A1 Dec. 5, 2002

(30) Foreign Application Priority Data

May 31, 2001 (DE) ......................................... 101 27 542

(51) Int. Cl.[7] .............................. G02B 6/26; G02B 6/42
(52) U.S. Cl. .............................. 385/31; 385/33; 385/39; 385/49; 385/73; 385/74; 359/364; 359/365; 359/850; 359/853; 359/864; 359/869
(58) Field of Search ................................. 359/364, 365, 359/850, 853, 864, 869; 385/31, 33, 39, 49, 73, 74, 92

(56) References Cited

U.S. PATENT DOCUMENTS

| 4,156,556 | A | | 5/1979 | Klein et al. ............... 350/96.15 |
| 4,185,885 | A | | 1/1980 | Chown et al. ........... 350/96.18 |
| 4,740,951 | A | * | 4/1988 | Lizet et al. .................... 398/87 |
| 5,930,433 | A | * | 7/1999 | Williamson et al. ......... 385/116 |
| 6,061,489 | A | * | 5/2000 | Ezra et al. ................... 385/115 |
| 6,078,420 | A | * | 6/2000 | Macken ....................... 359/208 |
| 6,331,904 | B1 | * | 12/2001 | Daiber et al. .................. 359/32 |
| 6,498,872 | B2 | * | 12/2002 | Bouevitch et al. ............ 385/24 |
| 6,580,935 | B1 | * | 6/2003 | Wach et al. ................. 600/310 |
| 6,678,445 | B2 | * | 1/2004 | Tomlinson et al. ........... 385/37 |
| 2002/0067888 | A1 | * | 6/2002 | Morozov et al. ............. 385/37 |
| 2002/0164123 | A1 | * | 11/2002 | Hamerly et al. .............. 385/39 |
| 2002/0181856 | A1 | * | 12/2002 | Sappey et al. ................ 385/24 |
| 2003/0053204 | A1 | * | 3/2003 | Wise ........................ 359/399 |

FOREIGN PATENT DOCUMENTS

| DE | 33 16 236 A1 | 8/1984 | |
| DE | 196 50 853 A1 | 7/1997 | |
| JP | 59094730 A | * 5/1984 | ........... G02B/27/10 |

* cited by examiner

*Primary Examiner*—Akm Enayet Ullah
*Assistant Examiner*—Daniel Petkovsek
(74) *Attorney, Agent, or Firm*—Laurence A. Greenberg; Werner H. Stemer; Ralph E. Locher

(57) ABSTRACT

A coupling configuration for connecting an optical conductor to an opto-receiver has a parabolic mirror or a spherical mirror that reflects light emerging from the optical conductor onto a launching mirror through which the light is launched into the opto-receiver. Such a configuration is largely adjustment-free and therefore particularly suitable for the connection of single-mode fibers (SMF).

14 Claims, 3 Drawing Sheets

COUPLING CONFIGURATION FOR OPTICALLY COUPLING AN OPTICAL CONDUCTOR TO AN OPTO-RECEIVER

BACKGROUND OF THE INVENTION

Field of the Invention

The invention relates to a coupling configuration for optically coupling an optical conductor to an opto-receiver.

When optical glass fibers are connected through the use of a plug-in contact, it is necessary to achieve a very high accuracy when using single-mode fibers (SMF). Since the "active" core of SMF glass fibers measures only a few micrometers in diameter, the fibers in plug-in contacts must be adjusted accurately to a few hundredths of a micrometer in order to achieve good launching of the signal.

In the case of known connections, use is made of stepper motors ("stepper modules") that permit the plug-in contact, and thus the fiber end located therein, to be displaced minimally in the x-direction and y-direction. Once the optimum position has been found, the plug-in contact is held fast at that point through the use of fixers. High-precision stepper motors must be used in order to reach the optimum position. Moreover, the optimum position must be determined by a very complicated measuring method (measurement of the receiving eye). That renders the installation of SMFs, and in particular the adjustment of the connecting technology, very complicated. It constitutes one of the main problems in optical network engineering.

SUMMARY OF THE INVENTION

It is accordingly an object of the invention to provide a coupling configuration for optically coupling an optical conductor to an opto-receiver, which overcomes the hereinafore-mentioned disadvantages and at least eliminates the problem of the heretofore-known devices of this general type.

With the foregoing and other objects in view there is provided, in accordance with the invention, a coupling configuration for optically coupling an optical conductor to an opto-receiver having a coupling end surface. The coupling configuration comprises a concave mirror having a focal point. The concave mirror reflects light emerging from the optical conductor. A deflecting mirror is disposed substantially at the focal point of the concave mirror. The deflecting mirror deflects the light reflected by the concave mirror onto the coupling end surface of the opto-receiver.

In accordance with another feature of the invention, the concave mirror is, for example, a parabolic or spherical mirror.

The light emerging from the optical conductor is projected onto the concave mirror in the coupling configuration. This eliminates the necessity of guiding ends of first and second optical conductors onto one another through the use of guide rails. Moreover, "scattered light" emerging from the optical conductor is likewise picked up by the concave mirror, resulting in minimization of losses. The connection therefore no longer requires an adjustment, or does so at least only in a substantially coarse manner. A displacement of the light exit end of the optical conductor is largely immaterial. Due to the focusing properties of the concave mirror, the light emerging from the optical conductor is always focused at the focal point, and thus onto the deflecting mirror. The coupling configuration is therefore advantageously suitable for connecting SMFs where installation is critical.

Other features which are considered as characteristic for the invention are set forth in the appended claims.

Although the invention is illustrated and described herein as embodied in a coupling configuration for optically coupling an optical conductor to an opto-receiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
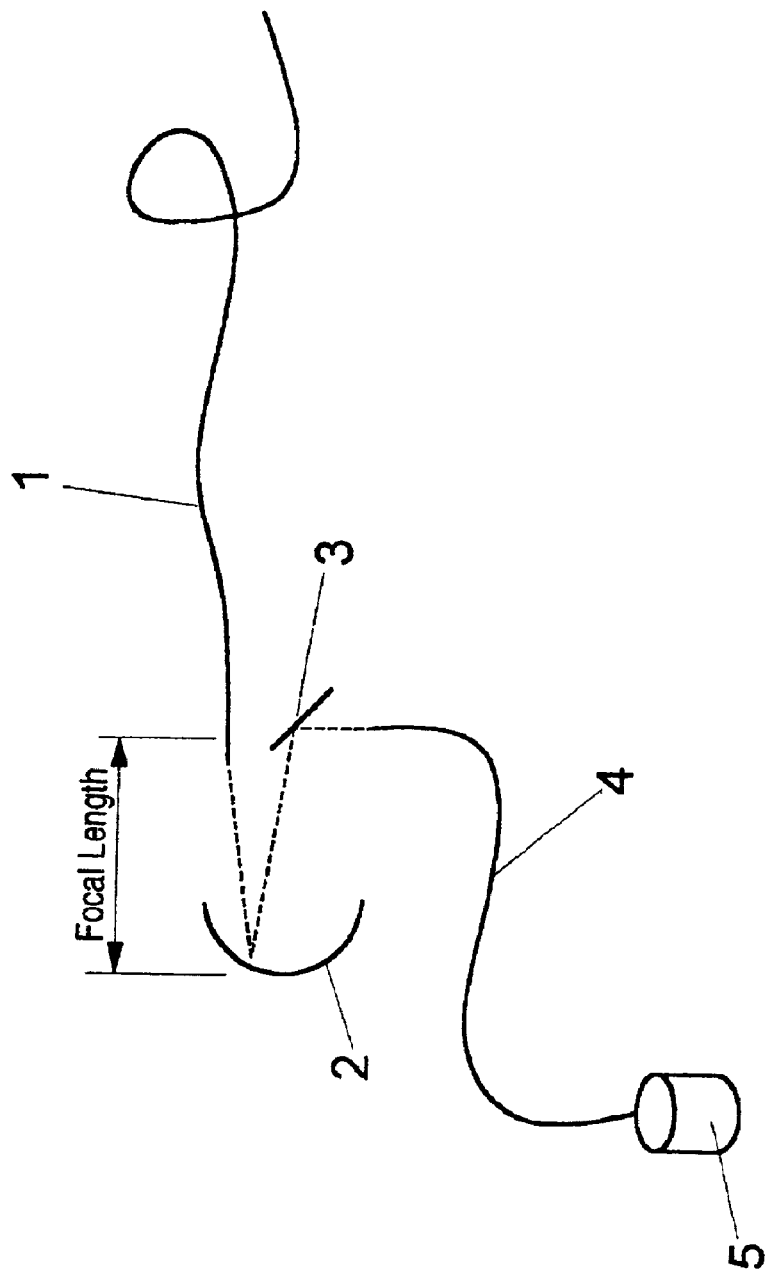
FIG. 1 is a diagrammatic, perspective view of a coupling configuration according to a first exemplary embodiment of the invention, with a parabolic mirror.

Referring now to the figures of the drawings in detail and first, particularly, to FIG. 1 thereof, there is seen a diagrammatically illustrated first exemplary embodiment based on the principle of the "Newton Reflecting Telescope". More specifically, light (illustrated by dashes) emerging from an SMF 1 is projected onto a parabolic mirror 2 and back from there onto a launching or coupling mirror 3, and launched or coupled by the launching mirror 3 into a receiver fiber 4. In this case, the launching mirror 3 is located exactly at the focal point of the parabolic mirror 2. The receiver fiber 4 then guides launched or coupled light to a receiver diode 5. The SMF 1 shown is part of a wide-area network (WAN).

Figure 2:
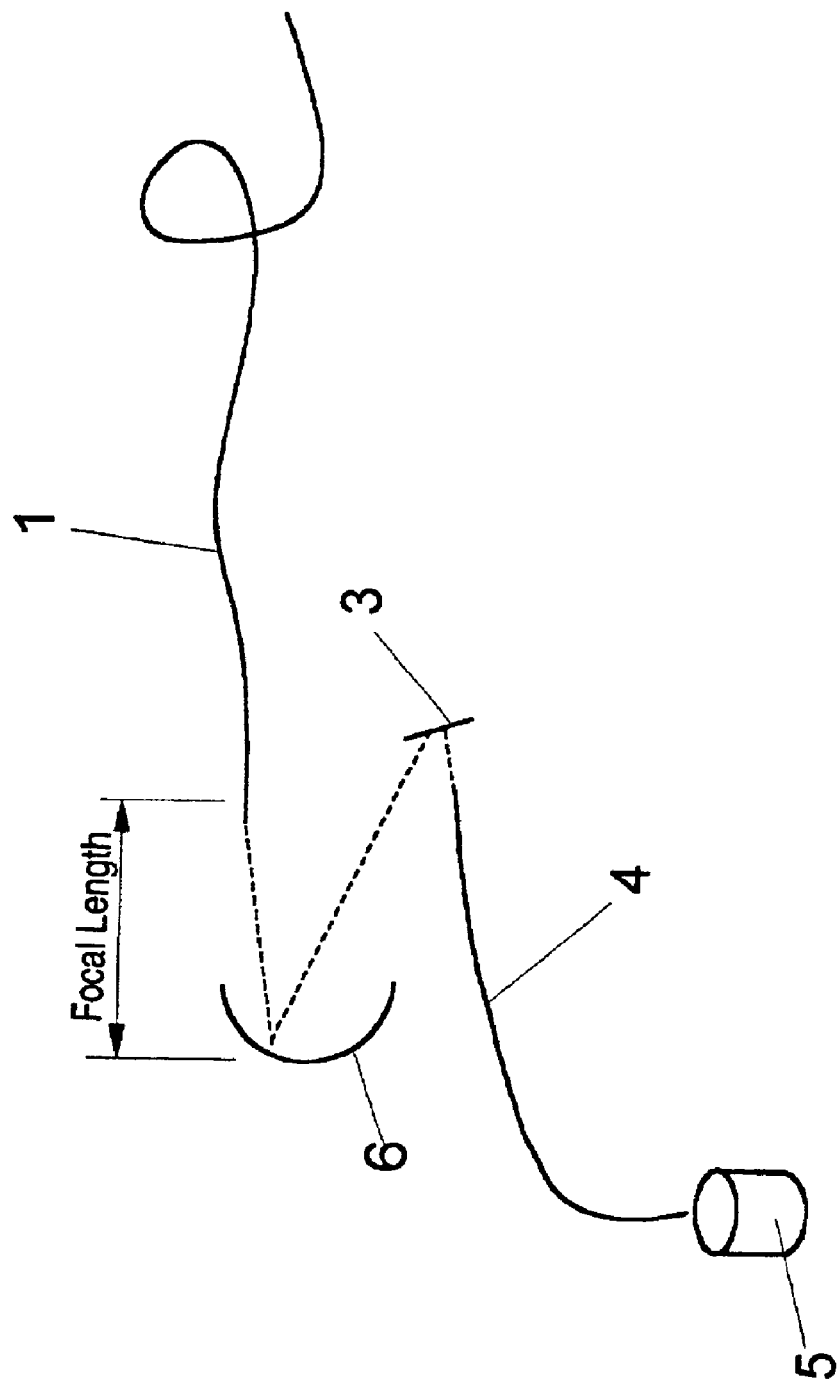
FIG. 2 is a view similar to FIG. 1 of a coupling configuration according to a second exemplary embodiment of the invention, with a spherical mirror.

A second exemplary embodiment, which is shown in FIG. 2 and is likewise diagrammatically illustrated, is based on the principle of the "Tilted Reflector". Instead of the parabolic mirror 2 in FIG. 1, use is made of a spherical mirror 6 that is disposed in such a way that the reflected light is not rectoreflected in the direction of the light exit end of the SMF1, but rather the focal point is offset from that direction.

Figure 3:
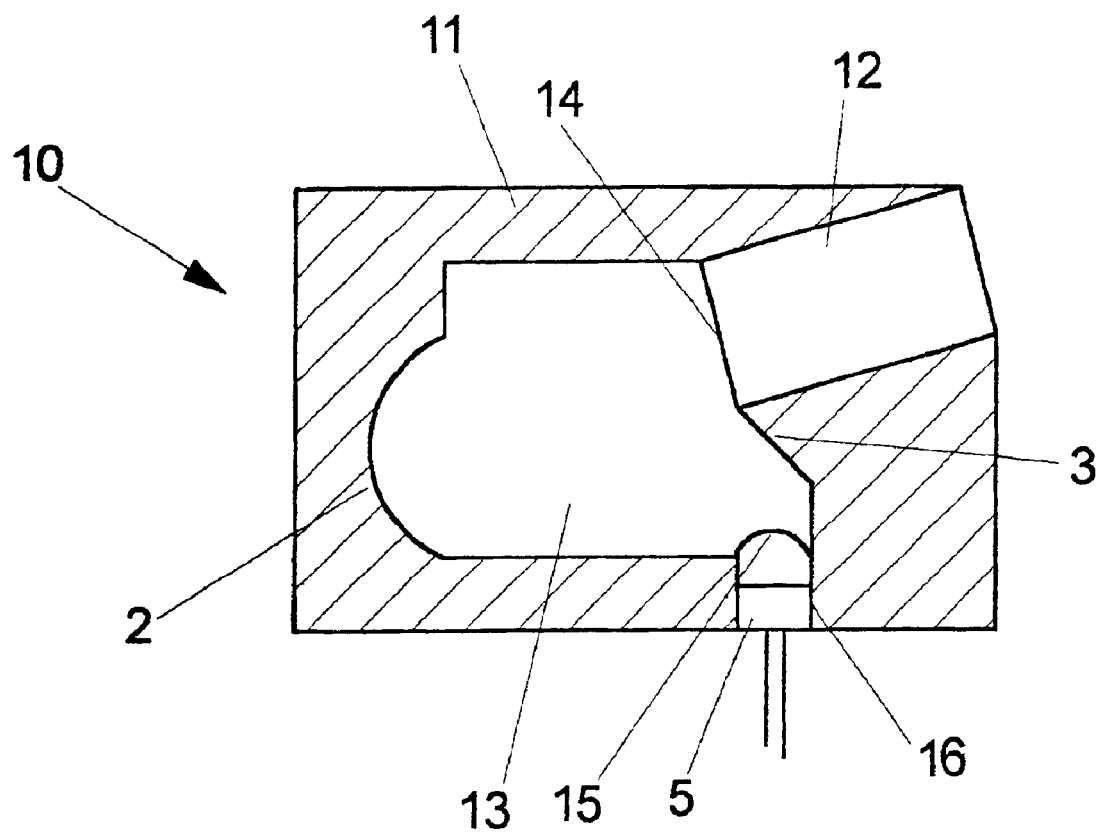
FIG. 3 is a sectional view illustrating an implementation of the coupling configuration according to the first exemplary embodiment.

FIG. 3 is a sectional view illustrating the structure of a coupling configuration 10 in accordance with the principle of the "Newton Reflecting Telescope" according to FIG. 1. The coupling configuration 10 has a housing 11 that preferably is formed of plastic. The SMF 1 is plugged into a first holder 12 which is integrated in the housing 11. An exit surface 14 of the SMF 1 points into a cavity 13 which is present inside the housing 11. The parabolic mirror 2 is fitted on a side of the cavity 13 opposite the exit surface 14. As described with reference to FIG. 1, the launching mirror 3 is disposed at the focal point of the parabolic mirror 2. A second holder 16 for a focusing lens 15 and the receiver diode 5 is provided on a side of the cavity 13 which is situated at the bottom of FIG. 3. In contrast with FIG. 1, in the structure illustrated in FIG. 3 the light is not fed through an optical conductor, but directly to the opto-receiver in the form of the receiver diode 5. The focusing lens 15 is disposed on a light entrance surface of the receiver diode 5.

Both the focusing lens 15 and the receiver diode 5 are plugged into the holder 16. Light reflected by the launching mirror 3 is focused by the focusing lens 15 and projected onto the receiver diode 5.

It is to be noted that the above-described invention is not limited to the exemplary embodiments described, but includes modifications within the scope of the protection defined by the claims.

I claim:

1. A coupling configuration for optically coupling an optical conductor to an opto-receiver diode having a coupling end surface, the coupling configuration comprising:
    a concave mirror having a focal point, said concave mirror reflecting light emerging from the optical conductor;
    a deflecting mirror disposed substantially at said focal point of said concave mirror, said deflecting mirror deflecting the light reflected by said concave mirror onto the coupling end surface of the opto-receiver diode; and
    a housing having a cavity with sidewalls formed therein, said concave mirror and said deflecting mirror being disposed in said cavity and formed by a shape of said sidewalls of said cavity.

2. The coupling configuration according to claim 1, wherein said concave mirror is a parabolic mirror.

3. The coupling configuration according to claim 1, wherein said concave mirror is a spherical mirror.

4. The coupling configuration according to claim 1, wherein the optical conductor is formed of at least one optical glass fiber.

5. The coupling configuration according to claim 1, wherein the optical conductor is formed of at least one single-mode fiber.

6. The coupling configuration according to claim 1, wherein the opto-receiver diode is formed of at least one optical glass fiber.

7. The coupling configuration according to claim 1, wherein the opto-receiver diode is formed of at least one single-mode fiber.

8. The coupling configuration according to claim 1, which further comprises a focusing lens disposed at the coupling end surface of the opto-receiver diode for focusing light reflected onto the coupling end surface of the opto-receiver diode.

9. The coupling configuration according to claim 1, wherein said housing has a first holder for accommodating an emitting end of the optical conductor and a second holder for accommodating the opto-receiver diode.

10. The coupling configuration according to claim 9, which further comprises a focusing lens disposed at said second holder at the coupling end surface of the opto-receiver diode for focusing light reflected onto the coupling end surface of the opto-receiver diode.

11. The coupling configuration according to claim 9, wherein said housing is formed of plastic.

12. The coupling configuration according to claim 1, wherein said cavity has opposite lateral parts respectively formed by said concave mirror and said deflecting mirror.

13. The coupling configuration according to claim 1, wherein the optical conductor has an emitting surface, the opto-receiver diode has a launching surface, and the emitting surface and the launching surface point into said cavity.

14. A coupling configuration for optically coupling an optical conductor to an opto-receiver diode having a coupling end surface, the coupling configuration comprising:
    a concave mirror having a focal point, said concave mirror directly receiving light emerging from the optical conductor and reflecting the light; and
    a deflecting mirror disposed at said focal point of said concave mirror, said deflecting mirror receiving the light reflected by said concave mirror and reflecting the light onto the coupling end surface of the opto-receiver diode; and
    a housing having a cavity with sidewalls formed therein, said concave mirror and said deflecting mirror being disposed an said cavity and formed by a shape of said sidewalls of said cavity.

* * * * *